(12) United States Patent
Chau et al.

(10) Patent No.: US 8,412,639 B2
(45) Date of Patent: Apr. 2, 2013

(54) SYSTEM AND METHOD FOR FACILITATING A SECURED FINANCIAL TRANSACTION USING AN ALTERNATE SHIPPING ADDRESS

(75) Inventors: Lee C Chau, Livingston, NJ (US); Glade R Erikson, Glendale, AZ (US); Desmond Liang, New York, NY (US); Nora Maude Hendrycks, New York, NY (US); Venkat Varadachary, New York, NY (US)

(73) Assignee: American Expres Travel Related Services Company, Inc., New York, NY (US)

( * ) Notice: Subject to any disclaimer, the term of this patent is extended or adjusted under 35 U.S.C. 154(b) by 0 days.

(21) Appl. No.: 11/933,602

(22) Filed: Nov. 1, 2007

(65) Prior Publication Data

US 2009/0119194 A1    May 7, 2009

(51) Int. Cl.
*G06Q 20/00* (2012.01)
*G06Q 40/00* (2012.01)
(52) U.S. Cl. ............................................ 705/74; 705/35
(58) Field of Classification Search .................... 705/74, 705/35
See application file for complete search history.

(56) References Cited

U.S. PATENT DOCUMENTS

| | | | |
|---|---|---|---|
| 6,675,153 B1* | 1/2004 | Cook et al. ........................ | 705/74 |
| 2001/0051917 A1* | 12/2001 | Bissonette et al. .............. | 705/39 |
| 2004/0205026 A1* | 10/2004 | Shah et al. ....................... | 705/50 |
| 2004/0254893 A1* | 12/2004 | Tsuei et al. ...................... | 705/74 |
| 2008/0028023 A1* | 1/2008 | Locke .............................. | 709/203 |

OTHER PUBLICATIONS

Weinstein, Margery; "Roses mailer nips bad addresses"; May 1, 2005; v22n5 pp. 9; ISSN: 0740-3119; Journal Code: CTA.*
Network_computing; "Online Fraud Detection Takes Diligence"; Feb. 18, 2002; p. 80; Journal ISSN: 1046-4468.*
Schell, Ernie; "Taking credit"; Dec. 2003; v26n12, pp. 39-40+; ISSN: 0889-5333.*

* cited by examiner

*Primary Examiner* — Lalita M Hamilton
*Assistant Examiner* — Edward Chang
(74) *Attorney, Agent, or Firm* — Snell & Wilmer L.L.P.

(57) ABSTRACT

The disclosed system enables merchants to ship products to a predefined address that may or may not be an account holder's billing address. The account holder may define one or more alias identifiers that correspond to a predefined shipping address. The predefined shipping address is stored with a corresponding alias identifier. A merchant order form includes a field to accept an alias identifier, such that when the order form is submitted to the merchant and the merchant prepares a purchase authorization request, the alias identifier is included in the request. The credit account issuer receives the payment authorization request and extracts the alias identifier, which is used to locate a matching stored alias identifier. A shipping address corresponding to the stored alias identifier is retrieved and returned to the merchant with an authorization message.

19 Claims, 4 Drawing Sheets

SYSTEM AND METHOD FOR FACILITATING A SECURED FINANCIAL TRANSACTION USING AN ALTERNATE SHIPPING ADDRESS

FIELD OF THE INVENTION

The present invention generally relates to transaction card fraud reduction, and more particularly, to providing an added level of security for Card Not Present (CNP) transactions and enabling consumers to designate a shipping address for items purchased over the Internet that is the same or different from the billing address, without the merchant incurring the fraud risk.

BACKGROUND OF THE INVENTION

Transaction cards (e.g., credit cards, debit cards, bank cards, charge cards, smart cards and the like) have become increasingly popular for purchasing goods and services and for conducting other transactions. Moreover, online and telephone based transactions are becoming even more popular as the number of online merchants increases. In its early stages, however, consumers were reluctant to use transaction cards over the Internet and/or telephone due to security concerns. To overcome the apprehension of the consumer to conduct purchases online, several secure protocols and cryptography schemes have been employed to better ensure that the consumer's transaction information remains private as it is electronically transported from one location to another.

Conventional Point of Sale (POS) transactions are normally facilitated by inserting, or sliding a transaction card through, a card reader which automatically downloads the card information, thereby allowing the information to be used during the authorization process without the need for manual input or review of the card information. This type of transaction is often referred to as a card present transaction because it is much easier to verify that the transaction card is in the presence of the transaction cardholder because it was required to be inserted into the POS terminal. Because card present transactions are generally viewed as being secure, transaction card providers are often willing to accept most of the fraud risk for lower risk merchants. For example, if a transaction card is stolen and used to facilitate a number of purchases, neither the cardholder nor the merchants who had accepted the transaction card for payment will be held responsible. Instead, the card issuer will provide payment to the affected merchants and the cardholder will not be billed.

Telephone and Internet based purchases do not constitute card present transactions, because it is often difficult or impossible to be assured that a transaction card used to facilitate a purchase is in the hands of the cardholder. Such transactions are often referred to as Card Not Present (CNP) transactions and the fraud risk is often shifted to the merchant. As such, many online merchants have been reluctant to accept transaction cards as a form of payment for online purchases. To attempt to overcome the substantial risk to online merchants, the use of transaction card information is often supplemented by various fraud prevention techniques such as, for example, only shipping purchased products to the billing address associated with the transaction card account. While some merchants have been willing to assume fraud risk by allowing items to be shipped to an address other than the account holder's billing address, others have been reluctant to do so. When a merchant requires the billing and shipping addresses to be the same, account holders are unable to have purchased items delivered to an alternative address such as, for example, a relative, friend or a place of business.

Accordingly, a system is needed which allows the consumer to purchase items for shipment to any desired address maintained by a credit account issuer. Further, there is a need to provide merchants with assurance that a shipping address has been verified by the cardholder's account issuer. Moreover, there is a need to provide credit account issuers with assurance against fraudulent purchases, such that a credit account issuer may more comfortably accept liability for fraudulent purchases.

SUMMARY OF THE INVENTION

The present invention provides for an account holder transaction account to be associated with one or more shipping addresses that are the same or different from the cardholder's billing address. Each alternate shipping address is associated with an address identifier, such that when processing a transaction request, an authorization system can locate a specifically desired shipping address based on matching a code or word from the transaction request with an address identifier. Contrary to prior art systems, the present invention enables products that are purchased online to be shipped to an address other than the billing address of an account holder with the fraud risk being assumed by the credit account issuer. The system enables the cardholder to define any number of potential shipping addresses and assign a unique keyword or code with each shipping address. When completing an online form, the account holder may designate a ship-to address by entering a desired keyword or code into a form field. When the merchant receives a completed online form, a transaction authorization request, including the keyword or code, is transmitted to the authorization system. The keyword is extracted from the request, matched with a keyword associated with a shipping address stored in a database, and the address is then retrieved and sent to the merchant along with the transaction authorization data. The merchant then ships the purchase product to the retrieved ship-to address.

More specifically, the system receives a payment request from a merchant related to a transaction for a consumer, wherein said payment request includes a alias identifier; obtains a stored alias identifier which corresponds to the shipping alias; retrieves a shipping address corresponding to the stored alias identifier, and provides the shipping address to the merchant and/or a third party shipper.

BRIEF DESCRIPTION OF THE DRAWINGS

A more complete understanding of the invention may be derived by referring to the detailed description and claims when considered in connection with the Figures, wherein like reference numbers refer to similar elements throughout the Figures, and:

DETAILED DESCRIPTION OF EXEMPLARY EMBODIMENTS

Figure 1:
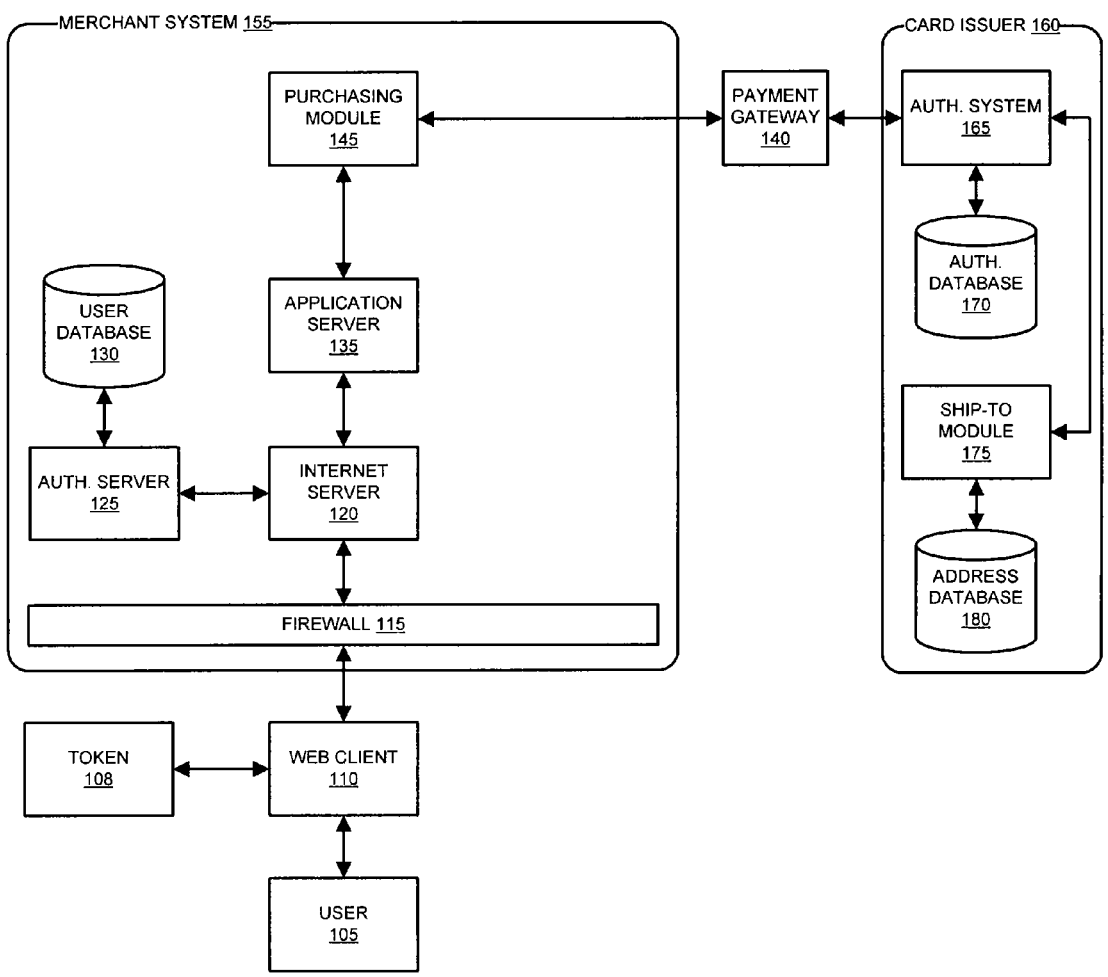
FIG. 1 is an overview of an exemplary system for obtaining a shipping address based on an alias identifier provided by a consumer.

The detailed description of exemplary embodiments of the invention herein makes reference to the accompanying drawings, which show the exemplary embodiment by way of illustration and its best mode. While these exemplary embodiments are described in sufficient detail to enable those skilled in the art to practice the invention, it should be understood that other embodiments may be realized and that logical, software and mechanical changes may be made without departing from the spirit and scope of the invention. Thus, the detailed description herein is presented for purposes of illustration only and not of limitation.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

In general, the invention enhances the security of transactions without requiring the use of a billing address as the shipping address. The invention is easily and readily adaptable to existing online order forms and commercial transaction processing systems. While the system may contemplate upgrades or reconfigurations of existing processing systems, changes to cardholder or merchant systems are not necessarily required by the present invention. For example, the present system may contemplate, but does not require: downloading of software modules, entering codes into existing commerce order forms, speaking an address alias identifier into a telephony-based order system, using a dynamically created code in conjunction with an address alias identifier, activation or deactivation of the address alias identifier, and registering for the service. Moreover, the transaction system can be seamlessly integrated into current electronic commerce processes with minimal to no changes to existing systems used by account holders or merchants.

While described herein in reference to facilitating transactions in an online environment, practitioners will appreciate that the invention may further be implemented to facilitate secure commerce transactions via other mediums where face-to-face interaction between the seller and purchaser is not possible and/or impractical. For instance, the invention may be used in conjunction with a telephony system configured to accept orders by way of a telephone representative or automated response system. The invention may further be used in conjunction with any Point of Sale (POS) type transactions and/or traditional paper order forms that may be mailed to a merchant. Other examples of such non-traditional commerce may take place by way of a variety of handheld devices such as palm computers and cellular telephones. Therefore, while the description makes frequent reference to a web client, practitioners will appreciate that this is but one embodiment and that other devices and/or methods may be implemented without departing from the scope of the invention.

For the sake of explanation, the use and processing of the address alias identifier will be used in the context of Internet based purchase transactions between a consumer (user 105) and a merchant (merchant system 155). While frequent reference is made herein to an alternative address, practitioners will appreciate that the alternative address may include the billing address. For example, some merchant web sites may not require entry of a billing address. In such cases, the account holder may enter an address alias identifier into an order form to be assured that items purchased will only be shipped to a predetermined address corresponding to the alias identifier and maintained by the credit account issuer. In other words, the motivation to commit fraudulent purchase transactions is greatly reduced because the user of a fraudulent transaction account will not be able to receive fraudulently purchase items.

With reference to FIG. 1, the system 100 includes a user 105 interfacing with a merchant system 155 by way of a web client 110. Transmissions between user 105 and Internet server 120 may pass through a firewall 115 to help to ensure the integrity of merchant 155 components. Practitioners will appreciate that the invention may incorporate any number of security schemes or none at all. In one embodiment, Internet server 120 receives page requests from web client 110 and interacts with various other merchant system 155 components to perform tasks related to requests from web client 110. Internet server 120 may invoke an authentication server 125 to verify the identity of user 105 and assign specific access rights to user 105. User database 130 stores information used in the authentication process such as, for example, user identifiers, passwords, access privileges, user preferences, user statistics, and the like. When a request to access merchant system 155 is received from Internet server 120, Internet server 120 determines if authentication is required and transmits a prompt to web client 110. User 105 enters authentication data at web client 110, which transmits the authentication data to Internet server 120. Internet server 120 passes the authentication data to authentication server 125 which queries user database 130 for corresponding credentials. When user 105 is authenticated, user 105 may access various merchant web pages and select one or more products and/or services for purchase.

When user 105 selects an item (e.g., information, product and/or service) for purchase, Internet server 120 may invoke an application server 135. Application server 135 invokes purchasing logic in purchasing module 145 by passing parameters relating to user 105's selection of items for purchase. Purchasing module 145 may further interact with an inventory database (not shown) to ensure that an adequate inventory level exists and tally the purchase transaction total including any applicable fees and taxes. Information confirming the selected items and the transaction amount is transmitted to web client 110 in a web page. User 105 confirms the purchase information, selects a payment option, and enters billing address, address alias identifier, and transaction card information into a purchase form.

User 105 may include any individual, business, entity, government organization, software and/or hardware that interact with system 100 to purchase products and/or services from one or merchants. User 105 may be, for example, a person shopping at home, or a procurement manager who interacts with system 100 to shop for and purchase goods and/or services for a department within a corporation. In another embodiment, user 105 is an automated shopping bot. User 105 may interface with Internet server 120 via any communication protocol, device or method discussed herein, known in the art, or later developed. In one embodiment, user 105 may interact with merchant system 155 via an Internet browser at a web client 110.

Web client 110 comprises any hardware and/or software suitably configured to facilitate input, receipt and/or review of information relating to purchases or any information discussed herein. Web client 110 includes any device (e.g., personal computer), which communicates (in any manner discussed herein) with merchant system 155 via any network discussed herein. Such browser applications comprise Internet browsing software installed within a computing unit or system to conduct online transactions and communications. These computing units or systems may take the form of a computer or set of computers, although other types of computing units or systems may be used, including laptops, notebooks, hand held computers, set-top boxes, workstations, computer-servers, main frame computers, mini-computers, PC servers, pervasive computers, network sets of computers, and/or the like. Practitioners will appreciate that web client 110 may or may not be in direct contact with merchant system 155. For example, web client 110 may access the services of merchant system 155 through another server, which may have a direct or indirect connection to Internet server 120.

As those skilled in the art will appreciate, web client 110 includes an operating system (e.g., Windows NT, 95/98/2000, OS2, UNIX, Linux, Solaris, MacOS, etc.) as well as various conventional support software and drivers typically associated with computers. Web client 110 may include any suitable personal computer, network computer, workstation, minicomputer, mainframe or the like. Web client 110 can be in a home or business environment with access to a network. In an exemplary embodiment, access is through a network or the Internet through a commercially available web-browser software package. Web client 110 may be independently, separately or collectively suitably coupled to the network via data links which includes, for example, a connection to an Internet Service Provider (ISP) over the local loop as is typically used in connection with standard modem communication, cable modem, Dish networks, ISDN, Digital Subscriber Line (DSL), or various wireless communication methods, see, e.g., Gilbert Held, Understanding Data Communications (1996), which is hereby incorporated by reference. It is noted that the network may be implemented as other types of networks, such as an interactive television (ITV) network.

Firewall 115, as used herein, may comprise any hardware and/or software suitably configured to protect merchant system 155 components from users of other networks. Firewall 115 may reside in varying configurations including stateful inspection, proxy based and packet filtering, among others. Firewall 115 may be integrated as software within Internet server 120, any other system components, or may reside within another computing device or may take the form of a standalone hardware component.

Internet server 120 may include any hardware and/or software suitably configured to facilitate communications between web client 110 and one or more merchant system 155 components. Further, Internet server 120 may be configured to transmit data to web client 110 within markup language documents. As used herein, "data" may include encompassing information such as commands, queries, files, data for storage, and/or the like in digital or any other form. Internet server 120 may operate as a single entity in a single geographic location or as separate computing components located together or in separate geographic locations.

Internet server 120 may provide a suitable web site or other Internet-based graphical user interface, which is accessible by users. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, InterBase, etc., may be used to provide an Active Data Object (ADO) compliant database management system.

Any of the communications, inputs, storage, databases or displays discussed herein may be facilitated through a web site having web pages. The term "web page" as it is used herein is not meant to limit the type of documents and applications that might be used to interact with the user. For example, a typical web site might include, in addition to standard HTML documents, various forms, Java applets, JavaScript, active server pages (ASP), common gateway interface scripts (CGI), extensible markup language (XML), dynamic HTML, cascading style sheets (CSS), helper applications, plug-ins, and/or the like. A server may include a web service that receives a request from a web server, the request including a URL (http://yahoo.com/stockquotes/ge) and an IP address (123.56.789). The web server retrieves the appropriate web pages and sends the data or applications for the web pages to the IP address. Web services are applications that are capable of interacting with other applications over a communications means, such as the Internet. Web services are typically based on standards or protocols such as XML, SOAP, WSDL and UDDI. Web services methods are well known in the art, and are covered in many standard texts. See, e.g., Alex Nghiem, IT Web Services: A Roadmap for the Enterprise (2003), hereby incorporated by reference.

Application server 135 may include any hardware and/or software suitably configured to serve applications and data to a connected web client 110. Like Internet server 120, application server 135 may communicate with any number of other servers, databases and/or components through any means known in the art. Further, application server 135 may serve as a conduit between web client 110 and the various systems and components of the merchant system 155. Internet server 120 may interface with application server 135 through any means known in the art including a LAN/WAN, for example. Application server 135 may further invoke purchasing module 145 in response to user 105 requests.

Purchasing module 145 may include any hardware and/or software suitably configured to receive requests from web client 110 via Internet server 120 and application server 135. Purchasing module 145 is further configured to process requests, construct database queries, execute queries against product database, as well as exchange data with card issuer 160 via payment gateway 140. In one embodiment, purchasing module 145 may be configured to interact with other merchant system 155 components to perform complex calculations, retrieve additional data, format data into reports, create XML representations of data, construct markup language documents, and/or the like. Moreover, purchasing module 145 may reside as a standalone system or may be incorporated with application server 135 or any other merchant system 155 component as program code.

The merchant system 155 and the card issuer 160 may be interconnected via a second network, referred to as a payment gateway. Payment gateway 140 may include any hardware and/or software suitably configured to facilitate communications and/or process transactions between merchant system 155 and card issuer 160. Payment gateways are commercially available and known in the art. Payment gateway 140 may be implemented through commercially available hardware and/or software, through custom hardware and/or software components, or through a combination thereof. Payment gateway 140 may reside in a variety of configurations and may exist as a standalone system or may be a software component residing either inside merchant system 155, card issuer 160, or any other known configuration. Payment gateway 140 may be configured to process transactions between purchasing module 145 and other systems and components within merchant system 155 and/or systems and components residing in card issuer 160. In one embodiment, payment gateway 140 may comprise web services that are invoked to exchange data between the various disclosed systems. The payment gateway represents existing proprietary networks that presently accommodate transactions for credit cards, debit cards, and other types of financial/banking cards. The payment gateway is a closed network that is assumed to be secure from eavesdroppers. Examples of the payment gateway or network include the American Express®, VisaNet® and the Veriphone® network.

In order to control access to application server 135 or any other component of merchant system 155, Internet server 120 may invoke an authentication server 125 in response to user 105 submissions of authentication credentials received at Intranet server 120. Authentication server 125 may include any hardware and/or software suitably configured to receive authentication credentials, encrypt and decrypt credentials, authenticate credentials, and/or grant access rights according to pre-defined privileges attached to the credentials. Authentication server 125 may grant varying degrees of application and data level access to users based on information stored within user database 130.

User database 130 may include any hardware and/or software suitably configured to facilitate storing identification, authentication credentials, and/or user permissions. Authorization database 170 stores data relating to account numbers, user descriptors, use parameters, and/or the like. Address database 180 stores address alias identifiers corresponding to shipping addresses as will be described in greater detail herein. One skilled in the art will appreciate that merchant system 155, card issuer 160 or any other component discussed herein, may employ any number of databases in any number of configurations. Further, any databases discussed herein may be any type of database, such as relational, hierarchical, graphical, object-oriented, and/or other database configurations. Common database products that may be used to implement the databases include DB2 by IBM (White Plains, N.Y.), various database products available from Oracle Corporation (Redwood Shores, Calif.), Microsoft Access or Microsoft SQL Server by Microsoft Corporation (Redmond, Wash.), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one aspect of the invention, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In one exemplary embodiment, the ability to store a wide variety of information in different formats is facilitated by storing the information as a BLOB. Thus, any binary information can be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data associated with the system by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments of system 100, the data can be stored without regard to a common format. However, in one exemplary embodiment of the invention, the data set (e.g., BLOB) may be annotated in a standard manner when provided for manipulating the data onto the financial transaction instrument. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a stand-alone interaction device configured to add, delete, modify, or augment the data in accordance with the header or trailer. As such, in one embodiment, the header or trailer is not stored on the transaction device along with the associated issuer-owned data but instead the appropriate action may be taken by providing to the transaction instrument user at the stand-alone device, the appropriate option for the action to be taken. System 100 contemplates a data storage arrangement wherein the header or trailer, or header or trailer history, of the data is stored on the transaction instrument in relation to the appropriate data.

One skilled in the art will also appreciate that, for security reasons, any databases, systems, devices, servers or other components of system 100 may consist of any combination thereof at a single location or at multiple locations, wherein each database or system includes any of various suitable security features, such as firewalls, access codes, encryption, decryption, compression, decompression, and/or the like.

The invention may be described herein in terms of functional block components, screen shots, optional selections and various processing steps. It should be appreciated that such functional blocks may be realized by any number of hardware and/or software components configured to perform the specified functions. For example, system 100 may employ various integrated circuit components, e.g., memory elements, processing elements, logic elements, look-up tables, and/or the like, which may carry out a variety of functions under the control of one or more microprocessors or other control devices. Similarly, the software elements of system 100 may be implemented with any programming or scripting language such as C, C++, Java, COBOL, assembler, PERL, Visual Basic, SQL Stored Procedures, extensible markup language (XML), with the various algorithms being implemented with any combination of data structures, objects, processes, routines or other programming elements. Further, it should be noted that system 100 may employ any number of conventional techniques for data transmission, signaling, data processing, network control, and/or the like. Still further, system 100 could be used to detect or prevent security issues with a client-side scripting language, such as JavaScript, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

These software elements may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, web pages, web sites, web forms, prompts, etc. Practitioners will appreciate that the illustrated steps described herein may comprise in any number of configurations including the use of windows, web pages, web forms, popup windows, prompts and/or the like. It should be further appreciated that the multiple steps as illustrated and described may be combined into single web pages and/or windows but have been expanded for the sake of simplicity. In other cases, steps illustrated and described as single process steps may be separated into multiple web pages and/or windows but have been combined for simplicity.

As used herein, "transaction" or similar terms may include any exchange of a monetary or other value for items. Specifically, with regard to the present invention, a transaction takes place when a holder of a transaction account provides an account code to a service establishment in order to facilitate a transfer of funds from the transaction account to the service establishment. A service establishment may comprise any merchant of goods, services, information and/or other items.

An "address alias identifier", "account", "account number" or "account code", as used herein, may include any device, code, number, letter, symbol, digital certificate, smart chip, digital signal, analog signal, biometric or other identifier/indicia suitably configured to allow the consumer to access, interact with or communicate with the system (e.g., one or more of an authorization/access code, personal identification number (PIN), Internet code, other identification code, and/or the like). The address alias identifier and/or account number may optionally be located on or associated with a rewards card, charge card, credit card, debit card, prepaid card, telephone card, embossed card, smart card, magnetic stripe card, bar code card, transponder, radio frequency card or an associated account. The system may include or interface with any of the foregoing cards or devices, or a fob having a transponder and RFID reader in RF communication with the fob. Although the system may include a fob embodiment, the invention is not to be so limited. Indeed, system may include any device having a transponder, which is configured to communicate with RFID reader via RF communication. Typical devices may include, for example, a key ring, tag, card, cell phone, wristwatch or any such form capable of being presented for interrogation. Moreover, the system, computing unit or device discussed herein may include a "pervasive computing device," which may include a traditionally non-computerized device that is embedded with a computing unit. Examples can include watches, Internet enabled kitchen appliances, restaurant tables embedded with RF readers, wallets or purses with imbedded transponders, etc.

The address alias identifier and/or account number may be distributed and stored in any form of plastic, electronic, magnetic, radio frequency, wireless, audio and/or optical device capable of transmitting or downloading data from itself to a second device. A consumer account number may be, for example, a sixteen-digit credit card number, although each credit provider has its own numbering system, such as the fifteen-digit numbering system used by American Express. Each company's credit card numbers comply with that company's standardized format such that the company using a sixteen-digit format will generally use four spaced sets of numbers, as represented by the number "0000 0000 0000 0000". The first five to seven digits are reserved for processing purposes and identify the issuing bank, card type, etc. In this example, the last (sixteenth) digit is used as a sum check for the sixteen-digit number. The intermediary eight to ten digits are used to uniquely identify the consumer. A merchant account number may be, for example, any number or alphanumeric characters that identify a particular merchant for purposes of card acceptance, account reconciliation, reporting, or the like.

Referencing the computer networked aspect of an exemplary embodiment of this invention; each participant is equipped with a computing system to facilitate online commerce transactions. The computing units may be connected with each other via a data communication network. The network is a public network and assumed to be insecure and open to eavesdroppers. In the illustrated implementation, the network is embodied as the Internet. In this context, the computers may or may not be connected to the Internet at all times. For instance, the cardholder computer may employ a modem to occasionally connect to the Internet, whereas the card provider computing center might maintain a permanent connection to the internet. It is noted that the network may be implemented as other types of networks, such as an interactive television (ITV) network.

Practitioners will appreciate that there are a number of methods for displaying data within a browser-based document. Data may be represented as standard text or within a fixed list, scrollable list, drop-down list, editable text field, fixed text field, pop-up window, and/or the like. Likewise, there are a number of methods available for modifying data in a web page such as, for example, free text entry using a keyboard, selection of menu items, check boxes, option boxes, and/or the like.

Referring now to the figures, the block system diagram and process flow diagram represent mere embodiments of the invention and are not intended to limit the scope of the invention as described herein. For example, the steps recited in FIGS. 2 to 4 may be executed in any order and are not limited to the order presented. It will be appreciated that the following description makes appropriate references not only to the steps depicted in FIGS. 2 to 4, but also to the various system components as described above with reference to FIG. 1. Moreover, while frequent reference is made herein to an account holder, practitioners will appreciate that other transaction devices may be used with the present invention to facilitate purchase transactions. Such transaction devices may include, for example, a transaction card, a smartcard, a Radio Frequency (RF) transponder, biometric data or scanners, and the like.

Figure 2:
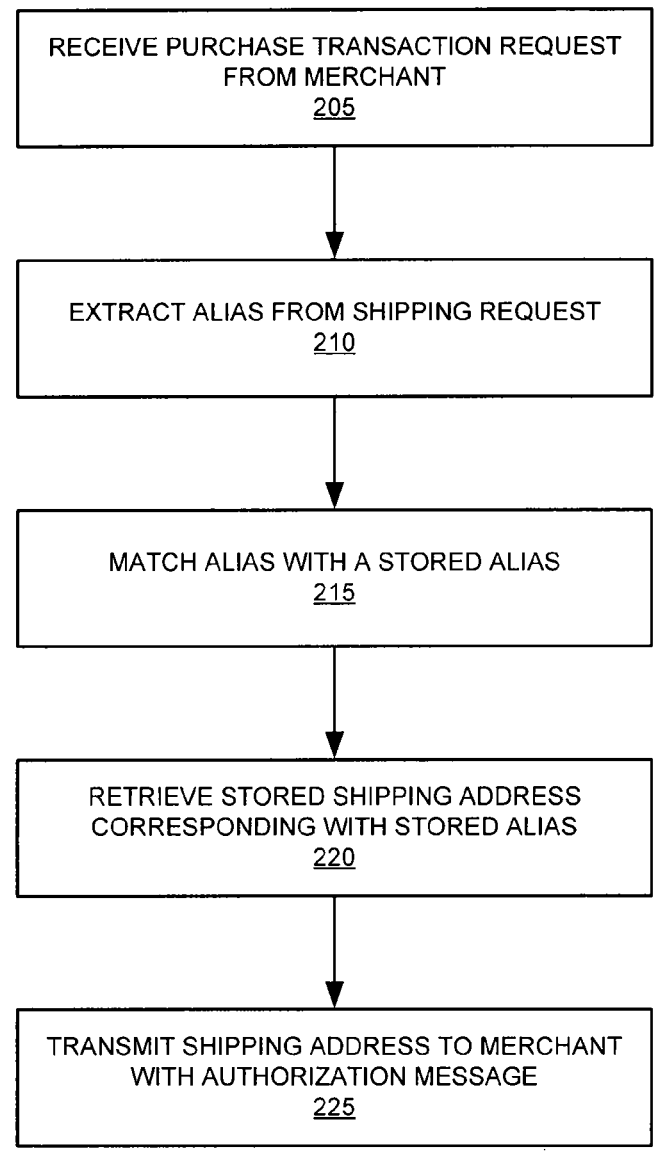
FIG. 2 is a process flow diagram showing a high-level view of an exemplary process for facilitating a secure online commerce transaction with an alternate shipping address.
Figure 3:
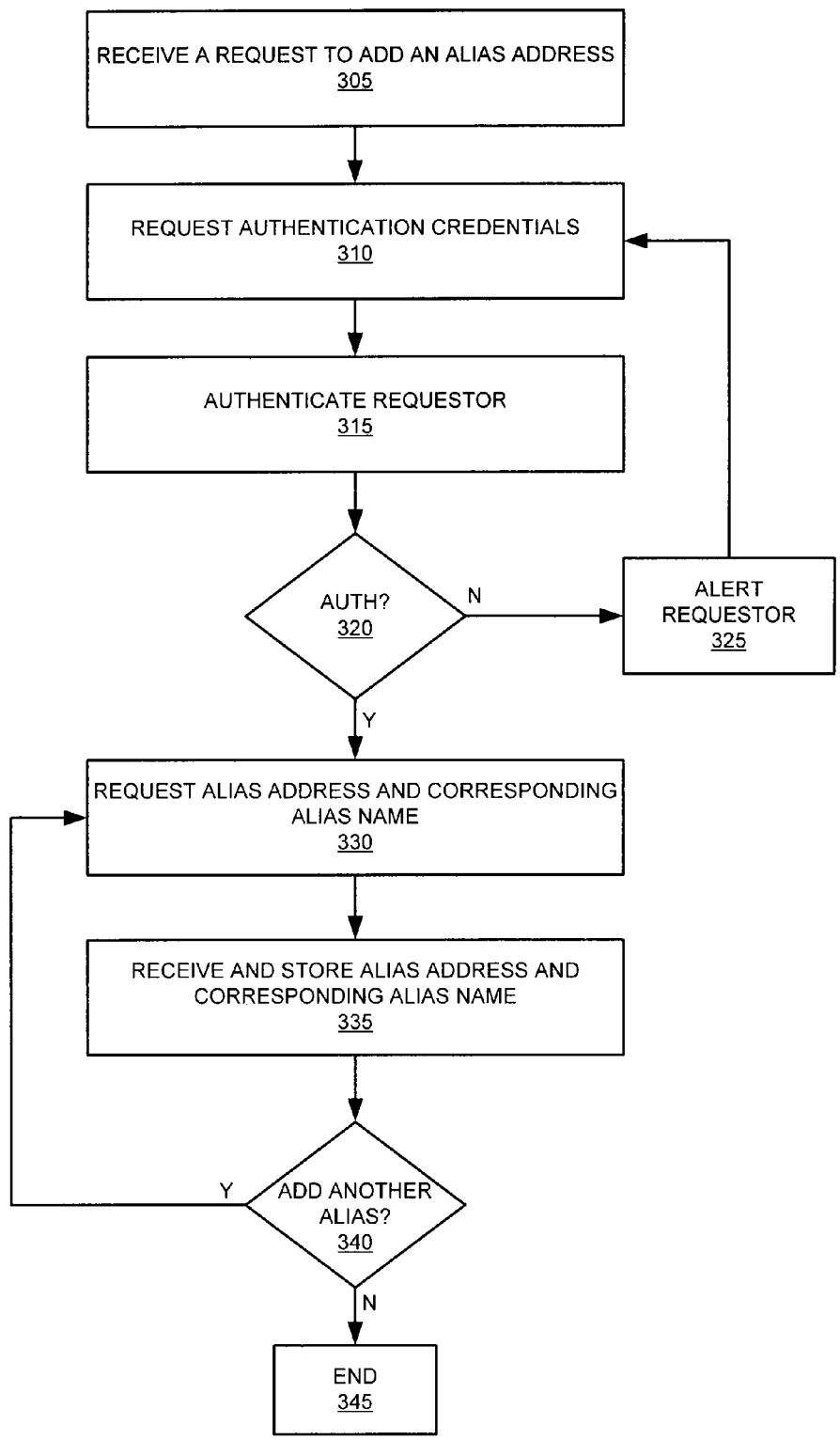
FIG. 3 is a process flow diagram showing an exemplary process for facilitating the configuration of alternative shipping addresses to be associated with a transaction account; and, FIG. 4 is a process flow diagram showing an exemplary process for obtaining a shipping address based on an alias identifier and providing the shipping address to a merchant.

In general, with reference to FIG. 2, an exemplary process for facilitating a secure online purchase transaction using an address alias identifier includes a merchant system 155 receiving a purchase transaction request including an address alias identifier (step 205). In one embodiment, a merchant order form may include a field designated for entry of an address alias identifier. In another embodiment, user 105 may enter an address alias identifier in an existing form field (e.g., a street address field). Practitioners will appreciate that an address alias identifier may be entered in any number of ways such as, for example, within a form field of the order form, within a popup window, within a toolbar, and the like. Moreover, a merchant order form may require user 105 to enter a verifiable password or any other like code, in addition to an address alias identifier.

Merchant system 155 receives a completed order form from web client 110 and transmits a payment authorization request, including an alias identifier, to authorization system 165. In addition to the alias identifier, the payment authorization request may further include, for example, the name of the purchaser, the name of the merchant, a service establishment code, an account code, an account expiration date, a transaction device security code, a billing address, a verification code, loyalty point information, and a payment amount. Authorization system 165 receives the purchase transaction request from the merchant (step 205) and invokes ship-to module 175 to extract the alias identifier (step 210). Ship-to module 175 searches and matches the address alias identifier with a stored alias (step 215). Practitioners will appreciate that security measures such as, for example, encryption may be employed to ensure the integrity of the alias identifier. As such, ship-to module 175 may decrypt an alias identifier prior to performing a search, or may perform a search based on the encrypted alias identifier, wherein the stored alias identifier is similarly encrypted. When a stored alias identifier is located that matches the alias identifier, a corresponding shipping address is retrieved from the address database (step 220). Authorization system 165 transmits the shipping address to merchant system 155 (or any other designated third party). The shipping address may be sent to the merchant within an authorization response (step 225). The authorization response may further include an indication that the account information was validated and that adequate funds are available.

The general process described in FIG. 2 above will now be described in more detail. More specifically, a process for defining one or more shipping addresses that are the same and/or different from an account holder's billing address will now be discussed with reference to FIG. 3. Card issuer 160 may receive a request to add an alias address for an existing account or a new account (step 305). Such request may be received by way of telephone, facsimile, email, website, instant message, text message, or any other method known in the art. However, for the sake of security, it may be preferable to receive the request by telephone or webpage, as these mediums allow for a greater degree of verification regarding the identity of the requester.

In response to the request to add an alias address (step 305), card issuer 160 invokes ship-to module 175 which requests authentication credentials (step 310) from user 105. Such authentication credentials may include, for example, a user identifier and password, a social security number, a response to a shared secret, a transaction device identifier, or any combination thereof. Ship-to module 175 authenticates user 105 by validating authentication credentials (step 315). If the supplied authentication credentials do not match credentials stored at the card issuer (step 320), then user 105 is alerted (step 325) and may again be issued a request for authentication credentials (step 310). When the supplied authentication credentials match stored credentials (step 320), then ship-to module 175 requests that user 105 supply an alternate shipping address and a corresponding alias identifier (step 330). For example, user 105 may desire to configure an alias address for his place of employment. Therefore, user 105 may provide the alternate shipping address (e.g., 3413 N. Pine Drive, Scottsdale, Ariz.) and provide a corresponding alias name (e.g., "Work").

Address alias identifier may be a "limited use" identifier or be associated with certain rules or restrictions. For example, the address alias identifier may be used for only one transaction (then deactivated), a predetermined number of transactions, only used in association with a specific shipping company, used in association with a predetermined list of shipping companies, restricted from use with certain shipping companies, provides notice to the account holder or certain parties when it is submitted or used by a shipping company, requires secondary approval for use (e.g., submission of the alias notifies the account holder who must send a confirming reply or email to allow the address to be used), use a certain shipping address if no alias or other shipping address is submitted, use a different shipping address (or rotate between shipping addresses) each time the same alias is submitted, use a certain shipping address depending on a certain time period (e.g., mail to my cabin during the summer, or to my work during the fall), and/or the like.

When ship-to module 175 receives the alias address and alias identifier (step 335), along with an optional limitation or rule (as discussed above), ship-to module 175 may verify the data, condition the data, and store the data (step 335) within address database 180, along with the limitation or rule. In one embodiment, user 105 may configure any number of alias addresses, limitations or rules. As such, ship-to module 175 may prompt user 105 to determine if there is another alias address to add (step 340), suggest alias identifiers, suggest certain limitations or rules, etc. If user 105 selects to configure another alias address (step 340), then ship-to module 175 again prompts user 105 to enter an alias address and corresponding alias identifier (step 330). If user 105 chooses not to add another alias address (step 340), then the process ends (step 345).

Figure 4:
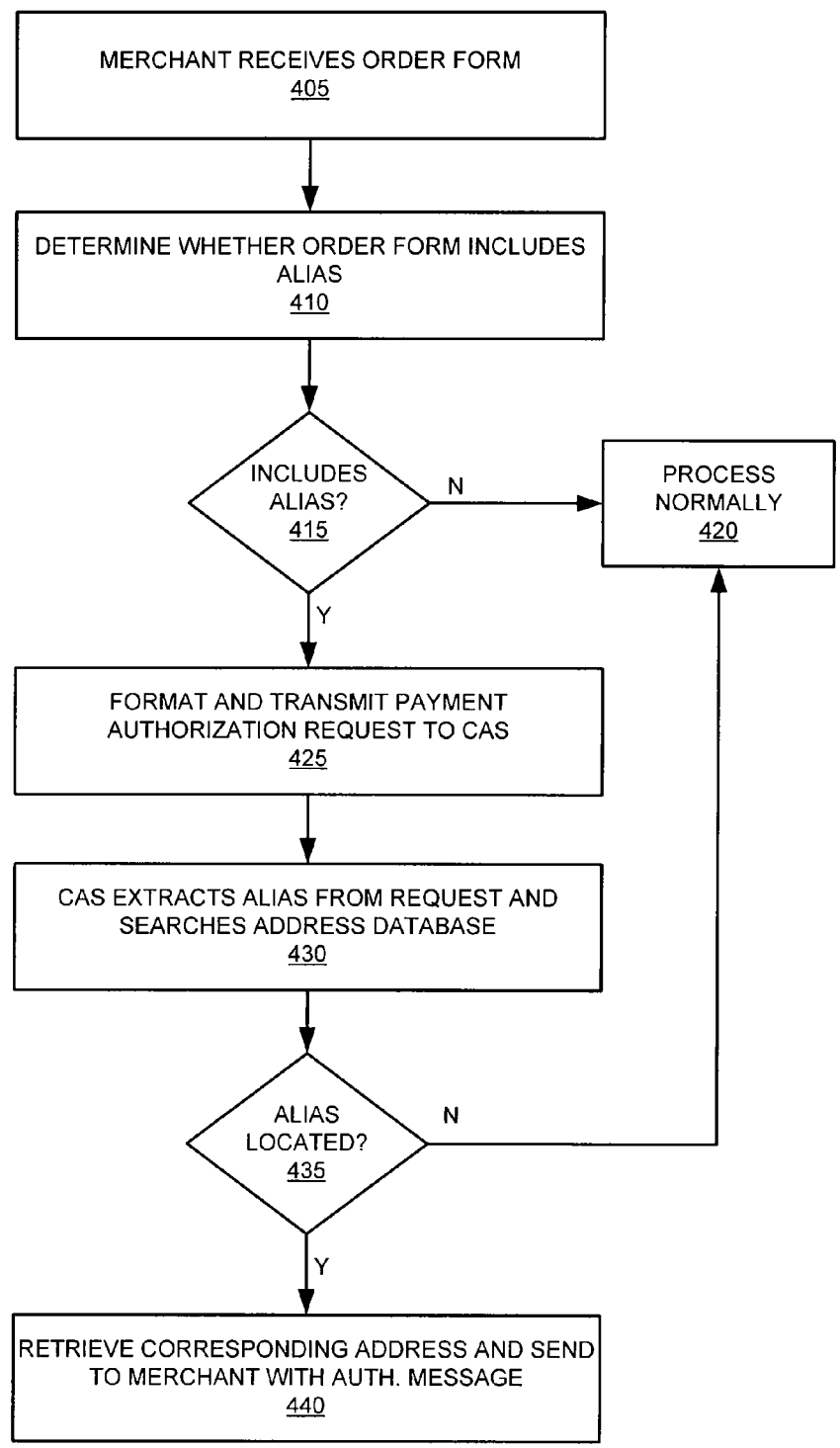

With reference to FIG. 4, in an online environment (e.g., telephone, Internet, etc), certain purchases using a transaction device are commonly referred to as Card Not Present (CNP) transactions, as there has traditionally been no way to ensure that the user of the transaction device is in physical possession of the transaction device. Accordingly, when user 105 chooses to purchase items in an online environment, user 105 initiates a CNP credit authorization request from a client computer (step 405). In response, purchasing module 145 verifies inventory, calculates a transaction amount, and presents web client 110 with an online order form. The order form may include a confirmation of the item(s) ordered along with a break-down of the transaction amount. User 105 completes the order form including entry of an alias ship-to address identifier. Information required on the order form may include, for example, the user's name, a shipping address, an alias identifier, a billing address, transaction card account number, transaction card expiration date, a delivery method selection, and the like. In one embodiment, an order form may be configured to accept the alias identifier within an existing order form. Practitioners will appreciate that such implementation of the invention would require none or very little modification to the HTML of the order form. For example, if the shipping address field is designated to accept an alias identifier, then the form would likely only require modification to allow submission of an online order form where all fields are not complete (e.g., city, state, postal code). In another embodiment, an online form may be modified to include an additional field that is specifically configured to accept an alias identifier. However, many merchants will automatically ship to the billing address to avoid the risk of incurring the cost of fraud. In such cases, an order form would likely require the addition of an alias identifier field.

The completed order form is received by the merchant system (step 405) as a credit authorization request and purchasing module 145 validates the content and form of the authorization request data. If data is missing or is not in the proper format, then purchasing module 145 may alert user 105 and present the form back to web client 110 where user 105 may enter requested corrections. The purchasing module 145 further determines whether the order form includes an alias identifier (step 410). In one embodiment, if the order form does not include an alias identifier (step 415), then the authorization request is processed in the normal fashion (step 420). In another embodiment, purchasing module 145 sends a request to the account holder to enter an alias identifier. If the order form includes an alias identifier (step 415), then purchasing module 145 formats the data from the order form and transmits a payment authorization request to authorization system 160 (step 425). Ship-to module 175 performs an analysis of the payment authorization request to extract the alias identifier and uses the alias identifier to search address database 180 for a corresponding stored alias identifier (step 430). In one embodiment, authorization system 165 performs payment authorization, while ship-to module 175 concurrently extracts and retrieves a ship-to address.

If ship-to module 175 does not locate a matching alias identifier (step 435), then the payment authorization is processed normally (step 420), or the system sends a request for a valid alias. In one embodiment, ship-to module 175 issues an abort message to authorization system 165 and transmits a message to merchant system 155 indicating that the supplied alias identifier is not valid. Accordingly, merchant system 155 may alert user 105 who is given an opportunity to correct the alias identifier, select another alias identifier, or accept delivery to the billing address. However, if ship-to module 175 locates a matching alias identifier (step 435), then the corresponding shipping address is retrieved from address database 180 and an authorization message, including the shipping address, is transmitted to merchant system (step 440). Purchasing module 145 adds the shipping address to the order and transmits a confirmation to user 105.

As described above, frequent reference is made to an address provisioning system that is hosted by a transaction account issuer, wherein the transaction account issuer returns a shipping address to a merchant. Those skilled in the art will appreciate that the disclosed functionality may be provided to any number of issuers within a provider network. For example, American Express may provide the disclosed services for acquired American Express branded products irrespective of the entity that issued the product. Moreover, the disclosed services may be hosted by a merchant acquirer, account provider, settlement system, bank, or any other party. In one embodiment, the disclosed address provisioning services may be performed, such that any number of transaction account issuers (e.g., MasterCard, Visa, Discover) may subscribe to the provided services.

In accordance with another embodiment, shipping aliases may be stored and/or maintained within any database. For example, the shipping aliases may be stored in a smart card chip, a cellular phone database, a palm pilot, a personal digital assistant, or any other database, component or system discussed herein or hereafter developed. In one embodiment, shipping aliases may be stored and maintained within a database of a shipping company. When purchasing module 145 determines that an order form includes an alias identifier, an authorization request, including the alias identifier, is transmitted to authorization system 165 by way of payment gateway 140. Ship-to module 175 extracts the alias identifier from the authorization request and searches for a matching stored alias identifier in address database 180. When a matching stored alias is located, ship-to module 175 retrieves a corresponding address code. The address code is transmitted to purchasing module 145 with an authorization message. Merchant system 155 finalizes the purchase transaction and adds the address code to a shipping label for the item to be shipped. When the item to be shipped is received or retrieved by the shipper, the address code is used to locate a matching stored address code from a database. When the matching stored address code is located, the shipper retrieves the corresponding alternate shipping address. The item is then delivered to the alternate shipping address.

In accordance with yet another embodiment, shipping aliases may be stored and maintained within a database of a merchant system 155. When purchasing module 145 determines that an order form includes an alias identifier, an authorization request, including the alias identifier, is transmitted to authorization system 165 by way of payment gateway 140. Ship-to module 175 extracts the alias identifier from the authorization request and searches for a matching stored alias identifier in address database 180. When a matching stored alias is located, ship-to module 175 retrieves a corresponding address code. The address code is transmitted to purchasing module 145 with an authorization message. Merchant system 155 uses the address code to locate a matching stored address code within user database 130. When the matching stored address code is located, the purchasing module 145 retrieves the corresponding alternate shipping address. Merchant system 155 addresses the purchased item in accordance with the alternate shipping address.

While the steps outlined above represent a specific embodiment of the invention, practitioners will appreciate that there are any number of computing algorithms and user interfaces that may be applied to create similar results. The steps are presented for the sake of explanation only and are not intended to limit the scope of the invention in any way.

Benefits, other advantages, and solutions to problems have been described herein with regard to specific embodiments. However, the benefits, advantages, solutions to problems, and any element(s) that may cause any benefit, advantage, or solution to occur or become more pronounced are not to be construed as critical, required, or essential features or elements of any or all the claims or the invention. It should be understood that the detailed description and specific examples, indicating exemplary embodiments of the invention, are given for purposes of illustration only and not as limitations. Many changes and modifications within the scope of the instant invention may be made without departing from the spirit thereof, and the invention includes all such modifications. Corresponding structures, materials, acts, and equivalents of all elements in the claims below are intended to include any structure, material, or acts for performing the functions in combination with other claim elements as specifically claimed. The scope of the invention should be determined by the appended claims and their legal equivalents, rather than by the examples given above. Reference to an element in the singular is not intended to mean "one and only one" unless explicitly so stated, but rather "one or more." Moreover, where a phrase similar to 'at least one of A, B, and C' is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

We claim:

1. A computer-implemented method comprising:

receiving, by an authorizing computer, an authorization request from a merchant related to a transaction, wherein said authorization request includes an alias identifier and a transaction account identifier, wherein a billing address is determined using said transaction account identifier;

authenticating, by said authorizing computer, said alias identifier based upon a stored alias identifier which corresponds to said transaction account identifier;

in response to said authenticating failing, authorizing said transaction based upon the billing address and providing, by said authorizing computer, an authorization response to said merchant, and setting a shipping address associated with said transaction to said billing address;

in response to said authenticating succeeding:

overriding a fraud prevention rule, wherein said fraud prevention rule requires said shipping address to be the same as said billing address;

in response to the overriding, assuming by an issuer said fraud risk associated with said transaction, wherein said issuer is associated with a transaction account associated with said transaction account identifier;

retrieving, by said authorizing computer, a rule using said stored alias identifier, wherein said rule includes logic for determining a first shipping address;

authorizing, by said authorizing computer, said transaction at least partially based upon at least one of: said authenticating said alias identifier or said rule;

determining, by said authorizing computer and based upon said rule, a first shipping address corresponding to said stored alias identifier, wherein said first shipping address is different from said billing address;

providing, by said authorizing computer, an authorization response to said merchant; and, providing, by said authorizing computer, said first shipping address to at least one of said merchant and a third party shipper.

2. The method of claim 1, further comprising:

receiving, by said authorizing computer, a request from said customer to add said first shipping address, wherein said request includes said transaction account identifier, said first shipping address and said alias identifier;

creating a data relationship among said consumer identifier, said first shipping address and said alias identifier; and, storing said first shipping address and said alias identifier under said stored alias identifier.

3. The method of claim 2, further comprising receiving a second request to add a second shipping address, wherein said second request includes said second shipping address and at least one of a second alias identifier or said rule.

4. The method of claim 1, wherein said alias identifier is equivalent to said stored alias identifier.

5. The method of claim 1, wherein said shipping address is at least one of: a physical address, email address, text messaging address, telephone number, facsimile number, an address code, or global positioning coordinates.

6. The method of claim 1, further comprising:
receiving, at said authorizing computer, a verification code which establishes an identity of at least one of: said consumer and said merchant; and
determining whether said verification code matches a stored verification code corresponding to said stored alias identifier.

7. The method of claim 1, further comprising notifying said merchant in response to said authenticating.

8. The method of claim 1, wherein said authorization request includes at least one of: a name of said consumer, a name of said merchant, a service establishment code, an account code, an account expiration date, a transaction device security code, a billing address, verification code, loyalty points, or a payment amount.

9. The method of claim 1, wherein said receiving said authorization request comprises receiving said authorization request via at least one of: Point of Sale (POS) device, web page, popup window, email, telephone or facsimile.

10. The method of claim 1, wherein said providing said first shipping address comprises providing said first shipping address via at least one of: Point of Sale (POS) device, web page, popup window, email, telephone or facsimile.

11. The method of claim 1, wherein said authorization response includes said first shipping address.

12. The method of claim 1, wherein said providing said first shipping address includes providing in accordance with said rule.

13. A computer-implemented method for receiving a consumer preferred shipping address for a transaction, said method comprising:
requesting, by a merchant computer, a shipping address by sending an authorization request to an authorizing computer related to said transaction for said consumer, wherein said authorization request includes an alias identifier and a transaction account identifier, wherein said authorizing computer determines a billing address based upon said transaction account identifier,
wherein said authorizing computer authenticates said alias identifier based upon a stored alias identifier which corresponds to said transaction account identifier,
wherein in response to said authenticating failing, said authorizing computer authorizes said transaction based upon the billing address, sets a shipping address associated with said transaction to said billing address, and provides an authorization response to said merchant computer,
wherein in response to said authenticating succeeding said authorizing computer:
overrides a fraud prevention rule, wherein said fraud prevention rule requires said shipping address to be the same as said billing address;
in response to overriding said fraud prevention rule, an issuer assuming said fraud risk associated with said transaction, wherein said issuer is associated with a transaction account associated with said transaction account identifier;
retrieves a rule using said stored alias identifier, wherein said rule includes logic for determining a first shipping address;
authorizes said transaction at least partially based upon at least one of: said authenticating said alias identifier or said rule;
determines, based upon said rule, a first shipping address corresponding to said stored alias identifier wherein said first shipping address is different from said billing address;
provides an authorization response to said merchant computer; and,
provides said first shipping address to at least one of said merchant computer and a third party shipper.

14. The method of claim 13, wherein said receiving comprises receiving said first shipping address from at least one of: an issuer of an account related to said payment request, a local database at said merchant, or a third party database.

15. The method of claim 13, wherein said receiving comprises at least one of said merchant or a third party shipper receiving said first shipping address.

16. The method of claim 13, further comprising determining said authorization response as invalid, wherein said authenticating comprises determining that said alias identifier is invalid.

17. A merchant system comprising:
a processor,
a tangible, non-transitory memory configured to communicate with said processor,
said tangible, non-transitory memory having instructions stored thereon that, in response to execution by said processor, cause said processor perform operations comprising:
requesting, by said processor, a shipping address by sending an authorization request to an authorizing computer related to said transaction for said consumer, wherein said authorization request includes an alias identifier and a transaction account identifier, wherein said authorizing computer determines a billing address upon said transaction account identifier,
wherein said authorizing computer authenticates said alias identifier based upon a stored alias identifier which corresponds to said transaction account identifier,
wherein in response to said authenticating failing, said authorizing computer authorizes said transaction based upon said billing address, sets a shipping address associated with said transaction to said billing address, and provides an authorization response to said merchant computer,
wherein in response to said authenticating succeeding said authorizing computer:
overrides a fraud prevention rule, wherein said fraud prevention rule requires said shipping address to be the same as said billing address;
in response to overriding said fraud prevention rule, an issuer assuming said fraud risk associated with said transaction, wherein said issuer is associated with a transaction account associated with said transaction account identifier;
retrieves a rule using said stored alias identifier, wherein said rule includes logic for determining a first shipping address;
authorizes said transaction at least partially based upon at least one of: said authenticating said alias identifier or said rule;
determines, based upon said rule, a first shipping address corresponding to said stored alias identifier wherein said first shipping address is different from said billing address;
provides an authorization response to said merchant computer; and, provides said first shipping address to at least one of said merchant computer and a third party shipper.

18. The method of claim 1, wherein said rule comprises at least one of: a transaction limit for said stored alias identifier, a time restriction for said stored alias identifier, a shipping company restriction for a shipping company associated with said transaction, a requirement for a secondary approval for said transaction, or a rule for determining a shipping address from among a plurality of shipping addresses each having a data relation with said stored alias identifier.

19. A system comprising:
a processor for authorizing transactions,
a tangible, non-transitory memory configured to communicate with said processor,
said tangible, non-transitory memory having instructions stored thereon that, in response to execution by said processor, cause said processor perform operations comprising:
  receiving, by said, processor, an authorization request from a merchant related to a transaction, wherein said authorization request includes an alias identifier and a transaction account identifier, wherein a billing address is determined using said transaction account identifier;
  authenticating, by said processor, said alias identifier based upon a stored alias identifier which corresponds to said transaction account identifier;
  in response to said authenticating failing, authorizing said transaction based upon said billing address and providing, by said processor, an authorization response to said merchant, and setting a shipping address associated with said transaction to said billing address;
  in response to said authentication succeeding:
    overriding a fraud prevention rule, wherein said fraud prevention rule requires said shipping address to be the same as said billing address;
    in response to said overriding, assuming by an issuer said fraud risk associated with said transaction, wherein said issuer is associated with a transaction account associated with said transaction account identifier;
    retrieving, by said processor, a rule using said stored alias identifier, wherein said rule includes logic for determining a first shipping address;
    authorizing, by said processor, said transaction at least partially based upon at least one of: said authenticating said alias identifier or said rule;
    determining, by said processor and based upon said rule, a first shipping address corresponding to said stored alias identifier, wherein said first shipping address is different from said billing address;
    providing, by said processor, an authorization response to said merchant; and,
    providing, by said processor, said first shipping address to at least one of said merchant and a third party shipper.

* * * * *

UNITED STATES PATENT AND TRADEMARK OFFICE
CERTIFICATE OF CORRECTION

PATENT NO. : 8,412,639 B2
APPLICATION NO. : 11/933602
DATED : April 2, 2013
INVENTOR(S) : Lee C. Chau et al.

Page 1 of 1

It is certified that error appears in the above-identified patent and that said Letters Patent is hereby corrected as shown below:

In the Claims

In Column 18 Line 26, after "cause said processor" please insert --to--.

In Column 18 Line 34, after "address" please insert --based--.

In Column 19 Line 17, after "cause said processor" please insert --to--.

In Column 20 Line 5, please delete "authentication" and insert therefor --authenticating--.

Signed and Sealed this
Twenty-first Day of May, 2013

Teresa Stanek Rea
*Acting Director of the United States Patent and Trademark Office*